（12）United States Patent
Sonnier et al.

(10) Patent No.: US 9,218,290 B2
(45) Date of Patent: Dec. 22, 2015

(54) DATA CACHING IN A NETWORK COMMUNICATIONS PROCESSOR ARCHITECTURE

(75) Inventors: David P. Sonnier, Austin, TX (US); David A. Brown, Austin, TX (US); Charles Edward Peet, Jr., Austin, TX (US)

(73) Assignee: Intel Corporation, Santa Clara, CA (US)

(*) Notice: Subject to any disclaimer, the term of this patent is extended or adjusted under 35 U.S.C. 154(b) by 1008 days.

(21) Appl. No.: 13/192,187

(22) Filed: Jul. 27, 2011

(65) Prior Publication Data

US 2011/0289180 A1 Nov. 24, 2011

Related U.S. Application Data

(63) Continuation-in-part of application No. 12/782,379, filed on May 18, 2010, now Pat. No. 9,081,742, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/421,243, filed on Dec. 9, 2010, provisional application No. 61/426,857, filed on Dec. 23, 2010.

(51) Int. Cl.
*G06F 12/00* (2006.01)
*G06F 12/08* (2006.01)

(52) U.S. Cl.
CPC .......... *G06F 12/0831* (2013.01); *G06F 12/084* (2013.01); *G06F 12/0811* (2013.01); *G06F 12/0813* (2013.01); *G06F 12/0884* (2013.01)

(58) Field of Classification Search
CPC ............ G06F 12/0866; G06F 12/0831; G06F 12/0897
USPC ......................................................... 711/119
See application file for complete search history.

(56) References Cited

U.S. PATENT DOCUMENTS

| 4,622,631 A | 11/1986 | Frank et al. |
| 5,623,698 A | 4/1997 | Stephenson et al. |
| 5,892,766 A | 4/1999 | Wicki et al. |
| 5,943,283 A | 8/1999 | Wong et al. |

(Continued)

FOREIGN PATENT DOCUMENTS

JP H02-271444 11/1990

*Primary Examiner* — Charles Rones
*Assistant Examiner* — Nanci Wong
(74) *Attorney, Agent, or Firm* — Nicholson De Vos Webster & Elliott LLP

(57) ABSTRACT

Described embodiments provide for storing data in a local cache of one of a plurality of processing modules of a network processor. A control processing module determines presence of data stored in its local cache while concurrently sending a request to read the data from a shared memory and from one or more local caches corresponding to other of the plurality of processing modules. Each of the plurality of processing modules responds whether the data is located in one or more corresponding local caches. The control processing module determines, based on the responses, presence of the data in the local caches corresponding to the other processing modules. If the data is present in one of the local caches corresponding to one of the other processing modules, the control processing module reads the data from the local cache containing the data and cancels the read request to the shared memory.

20 Claims, 8 Drawing Sheets

(56) References Cited

U.S. PATENT DOCUMENTS

| | | | |
|---|---|---|---|
| 6,038,630 A | 3/2000 | Foster et al. | |
| 6,195,335 B1 | 2/2001 | Calvignac et al. | |
| 6,240,492 B1* | 5/2001 | Foster et al. | 711/149 |
| 6,507,928 B1* | 1/2003 | Richardson | 714/800 |
| 6,567,564 B1 | 5/2003 | van der Wal | |
| 6,636,932 B1 | 10/2003 | Regev et al. | |
| 6,694,410 B1* | 2/2004 | Dang | 711/147 |
| 6,697,882 B1* | 2/2004 | Matsui | 710/6 |
| 7,089,346 B2 | 8/2006 | Cebulla et al. | |
| 7,234,018 B1 | 6/2007 | Purcell et al. | |
| 7,461,208 B1 | 12/2008 | Caprioli et al. | |
| 7,596,142 B1 | 9/2009 | MacAdam | |
| 2002/0029214 A1 | 3/2002 | Yianilos et al. | |
| 2002/0165985 A1 | 11/2002 | Chen et al. | |
| 2002/0199062 A1* | 12/2002 | Bormann | 711/118 |
| 2003/0033276 A1 | 2/2003 | Cheng et al. | |
| 2003/0115417 A1 | 6/2003 | Corrigan | |
| 2003/0123468 A1 | 7/2003 | Nong | |
| 2004/0255209 A1 | 12/2004 | Gross | |
| 2005/0021874 A1* | 1/2005 | Georgiou et al. | 709/250 |
| 2005/0027920 A1 | 2/2005 | Fitzsimmons et al. | |
| 2005/0152352 A1 | 7/2005 | Jun et al. | |
| 2006/0256783 A1 | 11/2006 | Ayrapetian et al. | |
| 2007/0016756 A1 | 1/2007 | Hsieh et al. | |
| 2007/0083870 A1* | 4/2007 | Kanakogi | 718/105 |
| 2007/0226798 A1 | 9/2007 | Sibert | |
| 2008/0162793 A1 | 7/2008 | Chu et al. | |
| 2009/0006718 A1* | 1/2009 | Blumrich et al. | 711/103 |
| 2009/0216915 A1* | 8/2009 | Dunn et al. | 710/22 |
| 2010/0241813 A1* | 9/2010 | Shen | 711/144 |
| 2010/0260198 A1 | 10/2010 | Rojas-Cessa et al. | |
| 2010/0278195 A1* | 11/2010 | Wagh et al. | 370/476 |
| 2010/0293353 A1* | 11/2010 | Sonnier et al. | 711/170 |
| 2011/0035555 A1* | 2/2011 | Wang et al. | 711/137 |
| 2011/0320728 A1* | 12/2011 | Dunn Berger et al. | 711/130 |

* cited by examiner

600

700

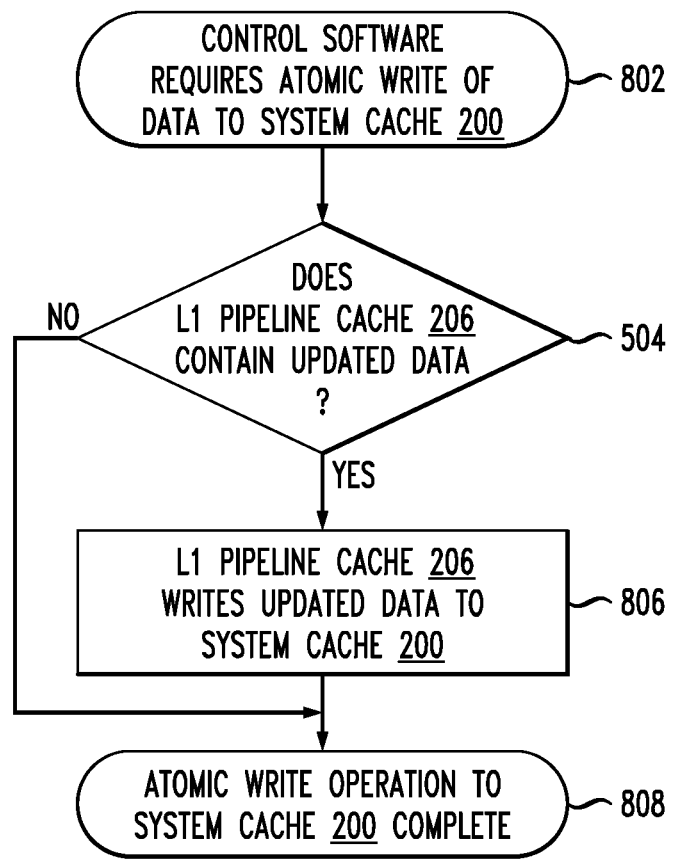

DATA CACHING IN A NETWORK COMMUNICATIONS PROCESSOR ARCHITECTURE

CROSS-REFERENCE TO RELATED APPLICATIONS

This application claims the benefit of the filing date of U.S. provisional application Nos. 61/421,243, filed Dec. 9, 2010 and 61/426,857, filed Dec. 23, 2010, the teachings of which are incorporated herein in their entireties by reference.

This application is a continuation-in-part, and claims the benefit of the filing date, of U.S. patent application Ser. No. 12/782,379 filed May 18, 2010 now U.S. Pat. No. 9,081,742, Ser. No. 12/782,393 filed May 18, 2010 now U.S. Pat. No. 8,255,644, and Ser. No. 12/782,411 filed May 18, 2010 now U.S. Pat. No. 8,407,707, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,717 filed Mar. 12, 2011, Ser. No. 13/046,719 filed Mar. 12, 2011, Ser. No. 13/046,726 filed Mar. 12, 2011, Ser. No. 13/192,104 filed on common date herewith, and Ser. No. 13/192,140 filed on common date herewith, the teachings of which are incorporated herein in their entireties by reference.

BACKGROUND OF THE INVENTION

1. Field of the Invention

The present invention relates to communication systems, in particular, to data caching and coherency maintenance for an accelerated processor architecture for packet networks.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors diminished performance improvements, or actually slowed down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed-pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators.

Network processors implemented as a system on chip (SoC) having multiple processing modules might typically classify an incoming packet to determine which of the processing modules will perform operations for the particular packet or flow of packets. Typical packet classification algorithms might perform a hashing operation on a portion of the packet data to determine a flow identifier of the packet. The hash value might be employed as an index into a lookup table storing identifiers of the various flows that are active within the network processor. In a typical network processor, millions of flows might be active at a given time and the storage requirements for the lookup table might become large.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide for storing data in a local cache of one of a plurality of processing modules of a network processor. A control processing module determines presence of data stored in its local cache while concurrently sending a request to read the data from a shared memory and from one or more local caches corresponding to other of the plurality of processing modules. Each of the plurality of processing modules responds whether the data is located in one or more corresponding local caches. The control processing module determines, based on the responses, presence of the data in the local caches corresponding to the other processing modules. If the data is present in one of the local caches corresponding to one of the other processing modules, the control processing module reads the data from the local cache containing the data and cancels the read request to the shared memory.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 shows an exemplary flow diagram of an atomic write operation of the network processor of FIG. 1.

DETAILED DESCRIPTION

Described embodiments of the present invention provide for storing data in a local cache of one of a plurality of processing modules of a network processor. A control processing module determines presence of data stored in its local cache while concurrently sending a request to read the data from a shared memory and from one or more local caches corresponding to other of the plurality of processing modules. Each of the plurality of processing modules responds whether the data is located in one or more corresponding local caches. The control processing module determines, based on the responses, presence of the data in the local caches corresponding to the other processing modules. If the data is present in one of the local caches corresponding to one of the other processing modules, the control processing module reads the data from the local cache containing the data and cancels the read request to the shared memory.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SRIO | Serial RapidIO | CPU | Central Processing Unit |
| SoC | System-on-Chip | µP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| DBC | Data Buffer Controller | THID | Thread Identifier |
| HE | Hash Engine | PQM | Pre-Queue Modifier |
| SENG | State Engine | FBI | Function Bus Interface |
| TID | Task Identifier | CCL | Classification Completion List |
| SCH | Scheduler | SEM | Semaphore Engine |
| SPP | Security Protocol Processor | PCM | Per Context Memory |
| TIL | Task Input Logic | PDU | Protocol Data Unit |
| TCP | Transmission Control Protocol | PIC | Packet Integrity Checker |
| IP | Internet Protocol | CRC | Cyclic Redundancy Check |

Figure 1:
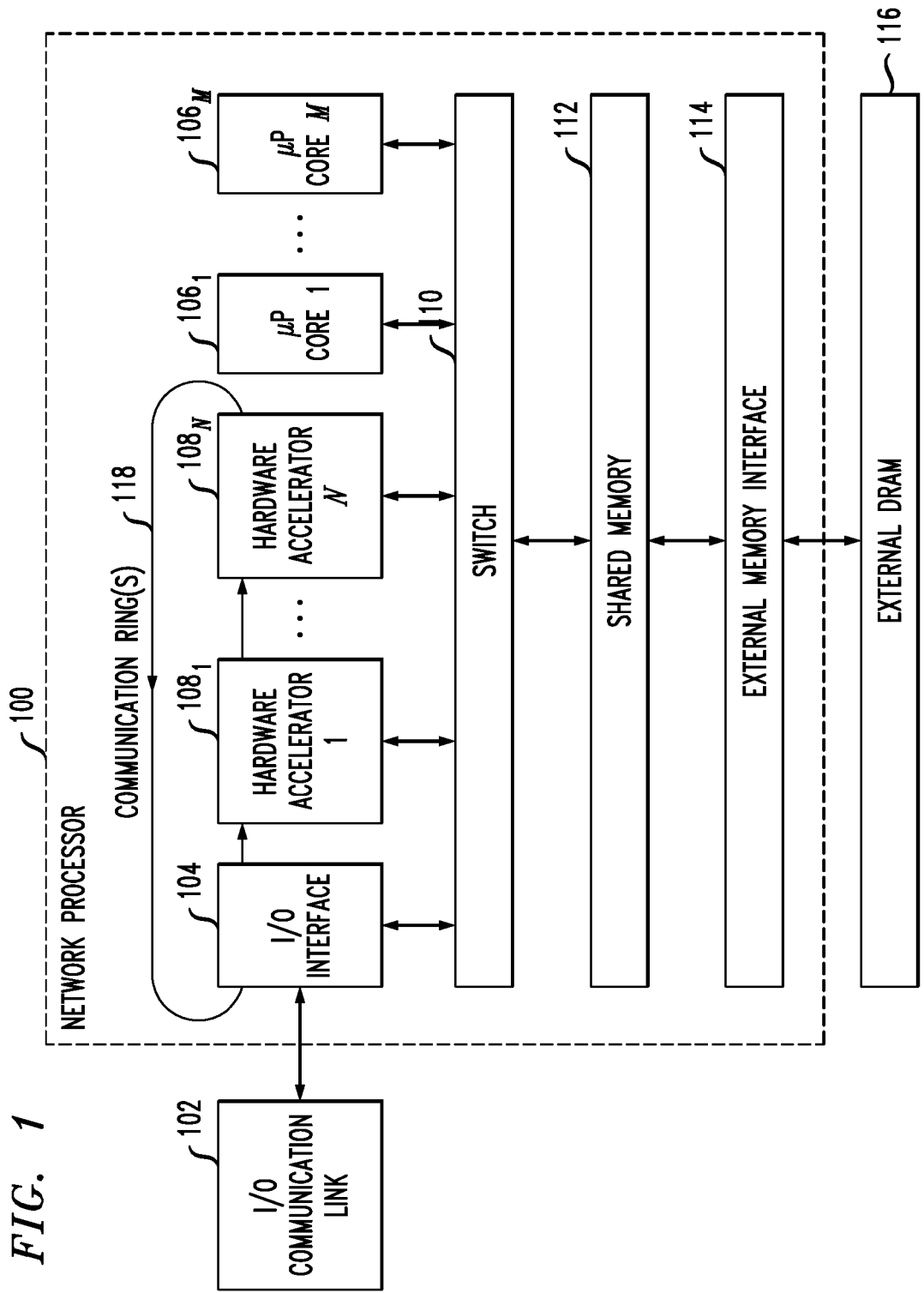
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent application Ser. No. 12/430, 438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. Hardware accelerators 108 might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,439,652 or U.S. Patent Application Publication No. 2008/0270342, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010, which is incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

Figure 2:
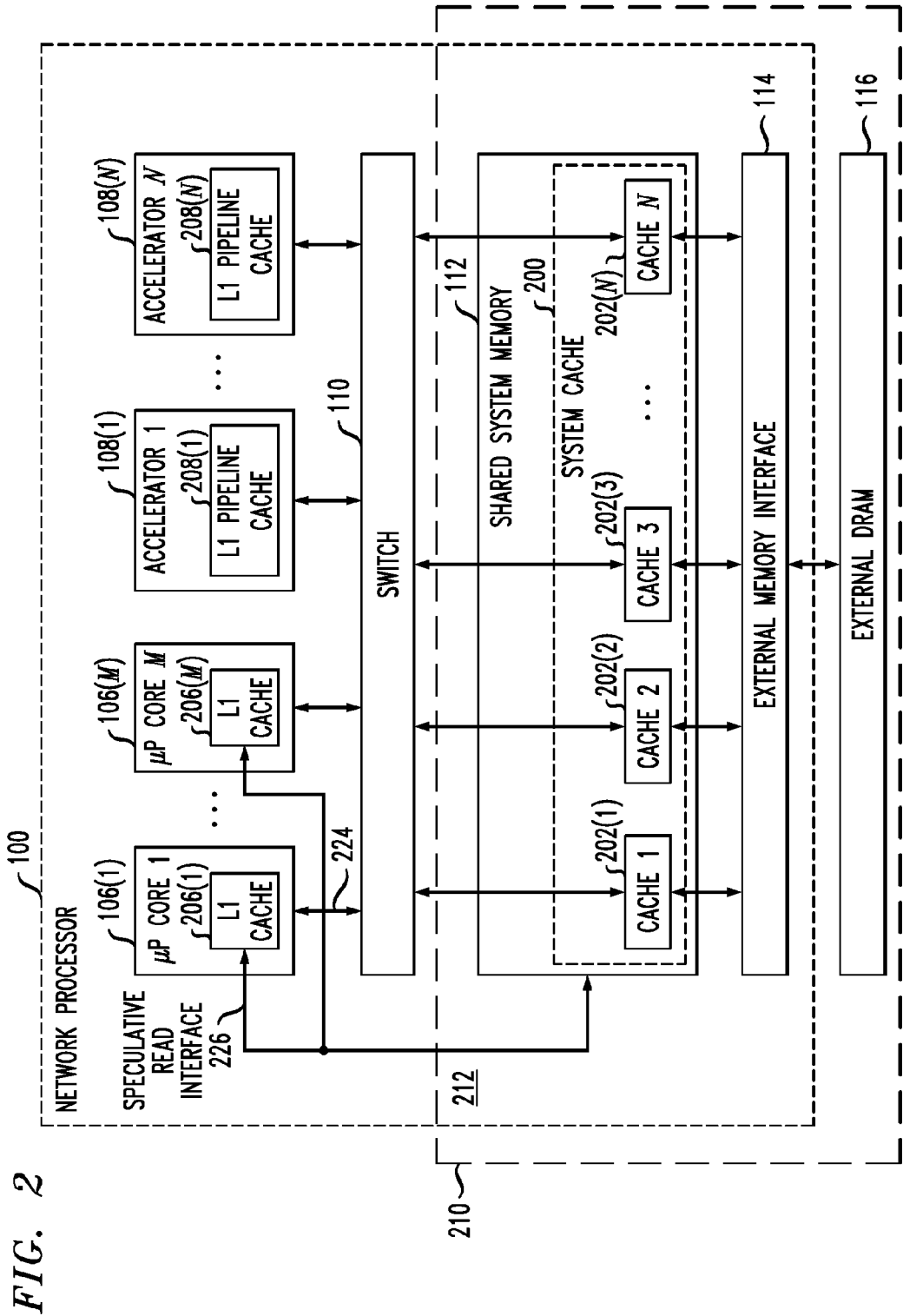
FIG. 2 shows a block diagram of a system cache of the network processor of FIG. 1.

FIG. 2 shows a block diagram of an exemplary embodiment of system cache 200 of network processor 100, in accordance with embodiments of the present invention. As shown in FIG. 2, system cache 200 might be implemented in shared memory 112. System cache 200 might include one or more individual caches, shown as caches 202(1)-202(N). Caches 202(1)-202(N) might be employed to cache data from any µP core or accelerator (e.g., µP cores 106 or accelerators 108) of network processor 100. In particular embodiments, system cache 200 might be employed to store packet data from µP cores 106 or accelerators 108. As described in related U.S. patent application Ser. Nos. 12/782,379, 12/782,393, and 12/782,411, which are incorporated by reference herein, caches 202(1)-202(N) might be addressed via switch 110 in such a way as to balance access to the caches, referred to herein as striping, helping to avoid hot spots in shared memory 112, improve performance of the caching in and out of external memory 116, and reduce cache access bottlenecks. As indicated by dashed line 210, shared memory 112 and external memory 116 might generally be referred to as system memory 212. In embodiments of the present invention, each cache 202(1)-202(N) might form a memory array, and the number of system caches might preferably be implemented as a power of two. One or more memory blocks might be allocated to each cache 202(1)-202(N). In embodiments of the present invention, each cache 202(1)-202(N) might be implemented as an N-way associative cache employing a least recently used (LRU) caching algorithm. In some embodiments, each cache 202(1)-202(N) might have a total size of 512 kB and a cache line length of 256 B.

As shown in FIG. 2, each of µP cores 106 might typically have a corresponding level one (L1) cache, shown as L1 caches 206(1)-206(M). Each of µP cores 106 might also include a level two (L2) cache (not shown). Such L1 and L2 caches might be implemented in accordance with the processor design of each µP core 106, for example a Power PC® processor implementation. Also as shown in FIG. 2, one or more of accelerators 108 might have one or more corresponding local L1 pipeline caches, shown as L1 pipeline caches 208(1)-208(N). The function of L1 pipeline caches 208(1)-208(N) is to act as an interface to system cache 200 for accelerators 108 of network processor 100. The term "pipeline" is used since L1 pipeline caches 208(1)-208(N) might typically be employed only for certain ones of accelerators 108 that access system cache 200 as part of an execution pipeline.

In general, an execution pipeline of a given one of accelerators 108 might be described as a series of pipeline stages. At a first pipeline stage, an accelerator 108 might determine that data is required to perform a processing task, and the data is located somewhere in system memory 212, which includes system cache 200, shared memory 112 and external memory 116. The given accelerator 108 provides a physical address of the required data to system cache 200 to prefetch the data before the data is needed to perform the processing task. System cache 200 determines whether it has the data corresponding to the physical address, or whether system cache 200 needs to retrieve the requested data from elsewhere in shared memory 112 or external memory 116. At one or more subsequent pipeline stages 2 through n, accelerator 108 might begin receiving data from system cache 200 and save the data in its L1 pipeline cache 208. Stages 2 through n might typically represent times where accelerator 108 is waiting for data to return from system resources with relatively higher latency, such as external memory 116.

At one or more subsequent pipeline stages n through m, accelerator 108 performs processing using the fetched data. At pipeline stages greater than m, accelerator 108 is finished with the fetched data and might write the data from its local L1 pipeline cache 208 to system cache 200. Accelerator 108 might also discard the data in its local L1 pipeline cache 208. In described embodiments of the present invention, the number of entries supported by each local L1 pipeline cache 208 (depth of L1 pipeline cache 208) is chosen to be at least equal to n+m, to support the number of pipeline stages of hardware accelerator 108 that access system cache 200 or external memory 116 to prevent hardware accelerator 108 from stalling due to latency of fetching data from system cache 200 or external memory 116. In described embodiments, ones of accelerators 108 might have a corresponding local L1 pipeline cache 208 that supports between 16 and 64 cache lines, with a cache line size between 16 B and 512 B. The number of cache lines and the cache line size might be a configuration setting of network processor 100 for each of accelerators 108.

As will be described herein, typical operations of L1 pipeline caches 208 might include (1) allocating a cache line entry; (2) checking to see if an allocated cache line entry contains the requested data from system cache 200; (3) reading and writing a cache line entry; (4) deallocating a cache line entry; and (5) coherent updates of data from L1 pipeline cache 208 to system cache 200 by control software operating on a processing module of network processor 100 (e.g., one of µP cores 106).

Embodiments of the present invention allow a client processing module to issue a speculative read request to system memory 212 for data that could be stored in system cache 200, elsewhere in system memory 112 or in external memory 116 and depending on whether the requested data is located in a local L1 cache 206 of one or more µP cores 106 of network processor 100. When a speculative read request is received by system cache 200, the speculative read request might be placed in a corresponding queue if prior speculative read requests are currently being processed. When a speculative read request is processed, system cache 200 might perform some preliminary operations, such as determining whether the requested data is within the cache or can be read from elsewhere in shared memory 112 or external memory 116. The speculative read request might then either be completed or discarded depending on a sideband signal. If the speculative read request is discarded, the state of the system cache is unaltered. If the sideband signal is received within certain time period, the speculative read request is completed as a normal read operation. The purpose of the speculative read is to process as much of the request as possible before a commitment to send data back to the requester or altering the state of the system cache.

As shown in FIG. 2, each µP core 106 might have a corresponding local level one (L1) cache, shown as L1 caches 206(1)-206(N). In described embodiments, when one of µP cores 106 requests data from system cache 200, the requesting one of µP cores 106 first checks whether the requested data is located in one of L1 caches 206(1)-206(N) of one of the other µP cores 106. In embodiments of the present invention, the requesting one of µP cores 106 might request the other µP cores 106 to check their local L1 cache 206 by sending a request signal via one of the communication busses of network processor 100, for example, a Processor Local Bus (PLB), which is a microprocessor bus architecture introduced by IBM, or an Advanced eXtensible Interface (AXI), which is a higher frequency implementation of the Advanced Microcontroller Bus Architecture (AMBA) introduced by ARM Ltd.

To reduce latency of reading data not stored in one of the local L1 caches 206, the requesting one of µP cores 106 might also "speculatively" send the read request to system cache 200 in case none of the local caches has the data. To minimize the delay in retrieving data from shared memory 112 or external memory 116, the speculative read request is sent to system cache 200 at the same time as the L1 cache check is sent. If the L1 cache check is successful, the speculative read is cancelled. If the L1 cache check is unsuccessful, the data is read from the corresponding one of system cache 200, shared memory 112 or external memory 116.

As shown in FIG. 2, L1 caches 206 might communicate with system cache 200 via a main system cache interface 224. Main system cache interface might, for example, be through switch 110 as shown in FIGS. 1 and 2 to corresponding ones of caches 202(1)-202(N). Read requests from system cache 200, as well as external memory 116, might be sent via main interface 224. Speculative read requests might also be sent via main interface 224. For example, the read request data structure for the system cache might contain a "speculative read" indicator to differentiate between normal read requests and speculative read requests.

As shown in FIG. 2, L1 caches 206 might also include a sideband interface to system cache 200, shown as speculative read interface 226. In some embodiments, speculative read interface 226 is a two-bit sideband bus, with one bit indicating whether a corresponding speculative read request should proceed (e.g., the requested data was not stored in the L1 cache of another one of µP cores 106), and the second bit indicating whether the corresponding first bit is valid. System cache 200 might also include one or more queues for storing received speculative read requests, shown as queues 308 and 310 in FIG. 3. In some embodiments, queues 308 and 310 might be implemented as FIFO queues, and one queue might be employed for high priority speculative read requests, and another queue might be employed for low or regular priority speculative read requests.

When a speculative read request is received by system cache 200, the speculative read request is placed into one of queues 308 and 310. The output of queues 308 and 310 is arbitrated to determine which request goes to tag RAM 312 to lookup the physical address corresponding to the data requested by the speculative read operation. Tag RAM 312 is searched to determine whether the data corresponding to the speculative read request is in corresponding system caches 202. The speculative read request is held in the tag RAM 312 until its associated "proceed" sideband signal is received. In embodiments of the present invention, the Tag RAM 312 might maintain a list of one or more speculative read requests based on a request ID of each speculative read request.

If a "proceed" sideband signal is received from the requestor, the speculative read request is performed similarly as a normal read operation. For example, if the data is not already in system cache 200, the requested data is retrieved from external memory 116, written to system cache 200 and provided to the requestor via main interface 224; otherwise, the data is read from a corresponding location in system cache 200 and provided to the requestor via main interface 224. If a "proceed" sideband signal is not received, the speculative read request is discarded from queues 308 and 310 and any corresponding pending updates to tag RAM 312 might be discarded, or a response without data might be sent. In some embodiments, if the speculative read request included an indicator that the requestor expected a response, system cache 200 might send a sideband response to the requestor via speculative read interface 226 or main interface to system cache 304.

Figure 4:
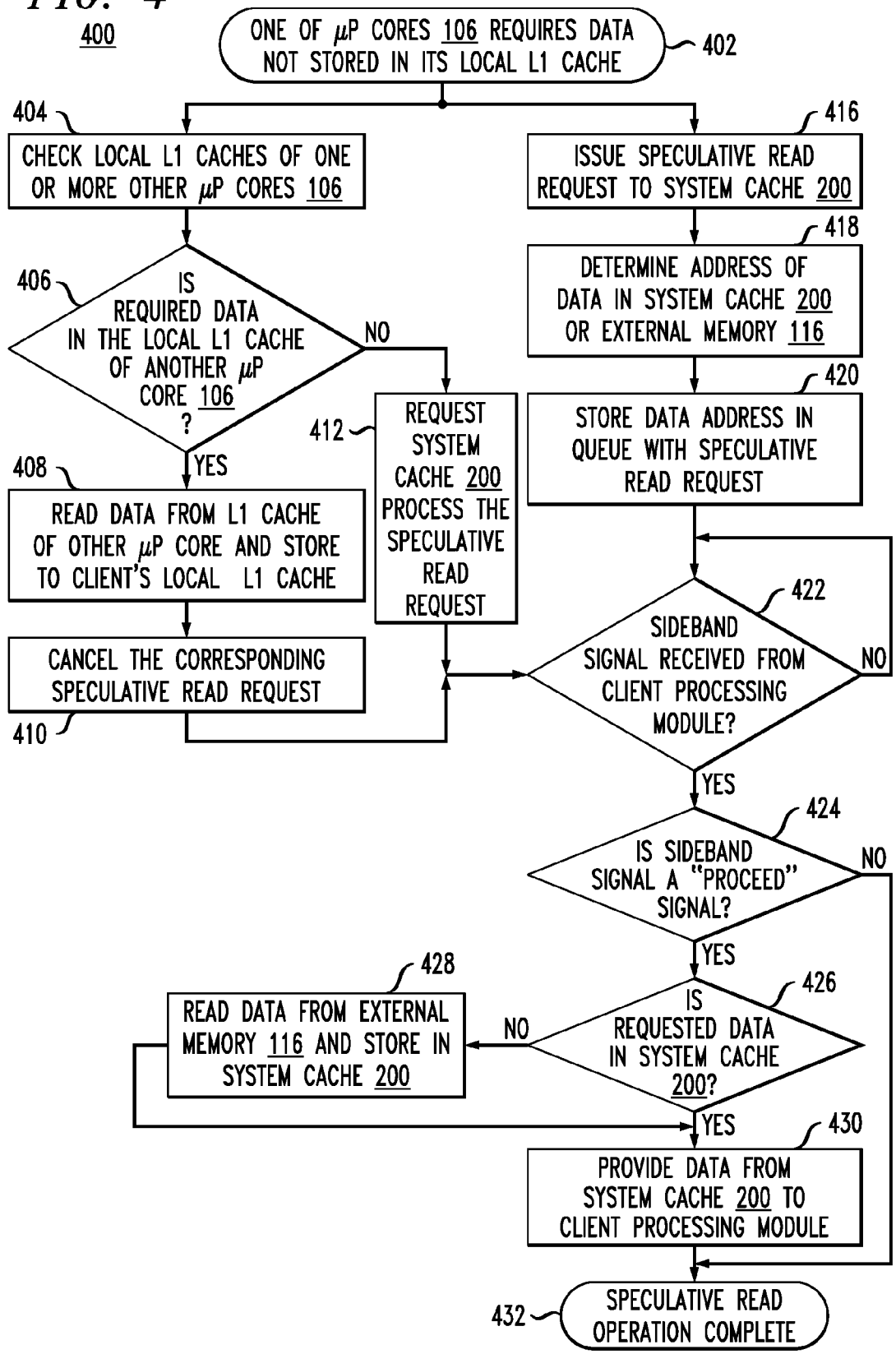
FIG. 4 shows an exemplary flow diagram of a speculative cache read process of the network processor of FIG. 1.

FIG. 4 shows a flow diagram of speculative cache read process 400. At step 402, a processing module of network processor 100, for example one of µP cores 106, requires data that is not stored in its corresponding local L1 cache, for example, the corresponding one of L1 caches 206(1)-206(N). At step 404, µP core 106 requests if the data is in a local cache of one or more of the other µP cores 106. At step 406, if the requested data is located in a local L1 cache of another µP core 106, then, at step 408, the requesting µP core 106 is provided the requested data from the L1 cache of the corresponding µP core 106 having the data, and the data is stored to the L1 cache of the requesting µP core 106. At step 410, the requesting µP core 106 cancels the corresponding speculative read request, since the data has already been retrieved. At step 406, if the requested data is not located in a local L1 cache of another µP core 106 of network processor 100, then, at step 412, the requesting µP core 106 sends a "proceed" signal to system cache 200 indicating that the speculative read request should be processed as a normal read request.

Figure 3:
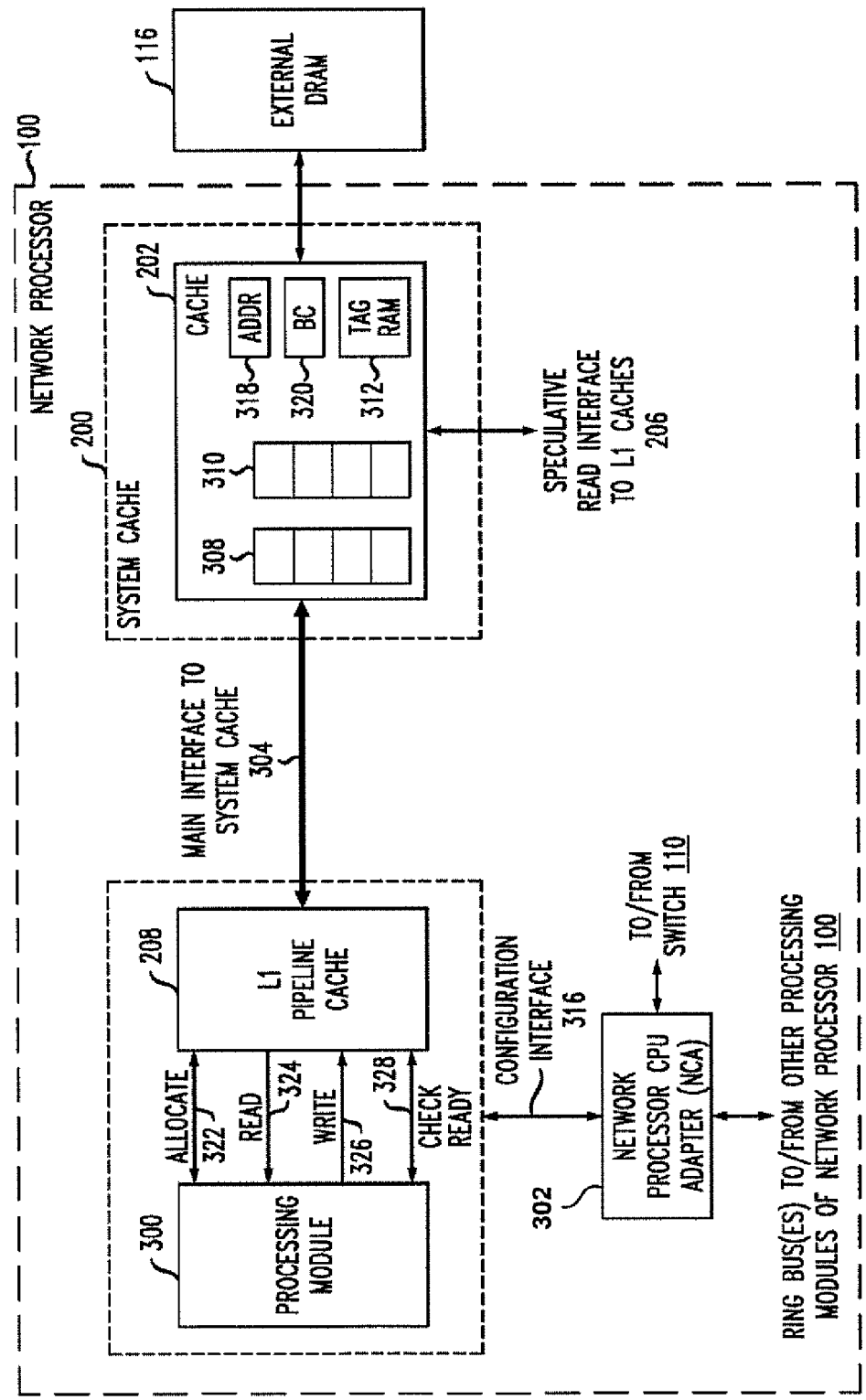
FIG. 3 shows a block diagram of an interface between a processing module, a level-one (L1) cache, and the system cache of the network processor of FIG. 1.

In parallel with step 404, at step 416, the requesting µP core 106 sends a speculative read request for the data to system cache 200. As described herein, a speculative read request might be sent to system cache 200 substantially similarly as a normal read request, but have an indicator set to show that the request is a speculative one. As shown in FIG. 3, system cache 200 might queue received read requests, including speculative read requests, in one or more queues. At step 418, the address of data corresponding to the speculative read request is determined and, at step 420, the address is stored, along with the speculative read request, in the corresponding queue. At step 422, system cache 200 pauses processing of the corresponding speculative read request until either a "proceed" signal (e.g., step 412) or a "cancel" signal (e.g., step 410) is received from the requesting µP core 106. At step 424, if the received sideband signal is a "proceed" signal, for example if the valid bit and the proceed bit of the sideband signal are set, then processing of the speculative read request continues to step 426. If, at step 426, the requested data is in the system cache 200, then, at step 430, the requested data is provided from the system cache 200 to the requesting µP core 106, and the speculative read request is complete at step 432. If at step 426 the requested data is in not in the system cache 200, then, at step 428, the requested data is read from the external memory 116 and stored in the system cache 200. Then, at step 430, the requested data is provided from the system cache 200 to the requesting µP core 106, and the speculative read request is complete at step 432. If, at step 424 the received sideband signal is a "cancel" signal, for example if the valid bit and the proceed bit of the sideband signal are cleared, then processing of the speculative read request is cancelled and processing of the corresponding speculative read request is complete at step 432. As shown in FIG. 4, steps 404, 406, 408, 410 and 412 occur substantially in parallel with steps 416, 418, 420 and 422. Although not shown in FIG. 4, system cache 200 might process multiple speculative read requests from queues 308 and 310 substantially in parallel in a multithreaded fashion.

Ones of the various hardware accelerators 108 of network processor 100 that have dynamic state data stored in the same local caches as configuration state data use byte write capabilities of their local L1 pipeline caches 208 to change the appropriate data in the local cache. This byte write capability reduces write operations to system cache 200 by limiting partial write operations. In addition, it enables processing modules (such as the MTM) that store dynamic state data and configuration state data in the same cache line to support updating configuration data without having to flush their dynamic state data. At the start of a cache pipeline operation, the configuration state data stored in the cache line entry is used. If a configuration update, which might be an atomic write operation to system cache 200 as described herein, occurs while the cache line entry state data is being operated on ("in the pipeline"), any dynamic state data writebacks are performed as byte writes into the cache line entry so as to not overwrite the updated configuration state data. Thus the cache line entry contains both the latest dynamic state data as well as the updated configuration state data.

As shown in FIG. 3, L1 pipeline cache 208 has four interfaces to processing module 300 of accelerator 108: allocate interface 322, read interface 324, write interface 326 and check ready interface 328. Processing module 300 employs allocate interface 322 to request an entry line in L1 pipeline cache 208. A request from a client processing module, such as one of accelerators 108, might include the starting physical address of system memory 212 where the requested data is stored, and the number of bytes to read from system memory 212. As described herein, system memory 212 might include system cache 200, shared memory 112 and external memory 116. L1 cache 206 searches its entries for a match to the physical address to determine if the data is already in the cache. To detect if there is a match, L1 pipeline cache 206 compares the address from the allocation request to a tag memory of L1 pipeline cache 206 that a cache entry to an address in system memory 212.

Figure 5:
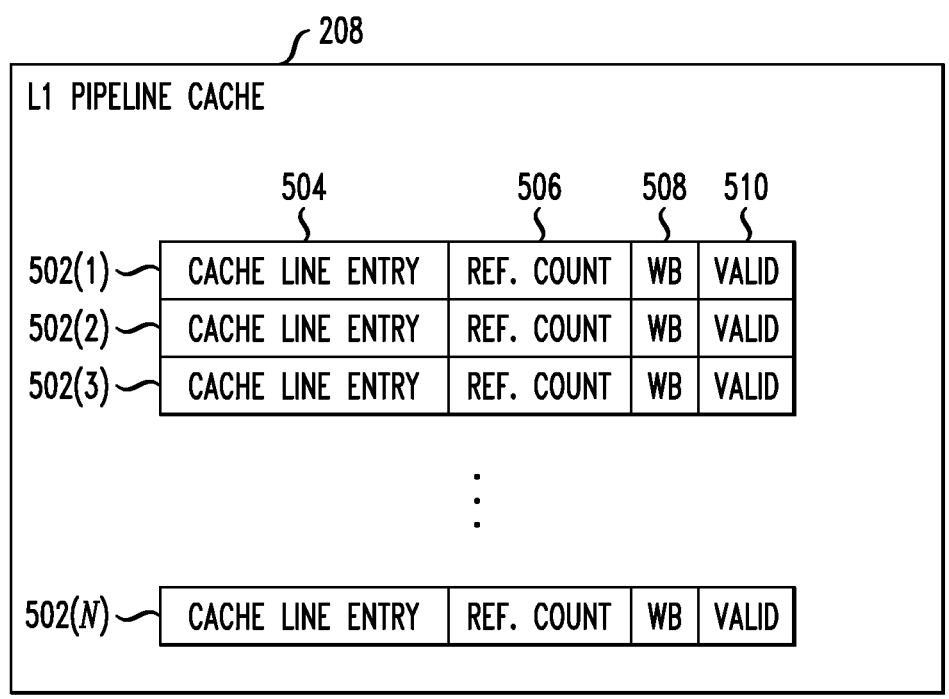
FIG. 5 shows an exemplary block diagram of the L1 cache shown in FIG. 3.

If the data requested in the allocate request is not already in L1 pipeline cache 208, L1 pipeline cache 208 allocates a free cache line entry (e.g., one of cache line entries 502(1)-502(N) shown in FIG. 5), sets the reference count corresponding to the allocated cache line entry to 1 (e.g., reference count 506), and returns the cache line entry number to a client processing module. Reference count 506 is used to track if the entry is in use by the client processing module. Any entry with a reference count greater than 0 is in use and is not a free entry. L1 cache 206 issues a read request to system memory 212 for the data requested by processing module 300, which might be all or part of the cache line.

If the data requested in the allocate request matches a cache line entry that is currently valid (as indicated by valid indicator 510) and either active (reference count 506 is greater than 0) or inactive (reference count 506 is 0), L1 cache increments reference count 506 by 1 and returns the cache line entry number to processing module 300. If the requested data is not currently in the entry or is not in the process of being fetched from system memory 212, L1 pipeline cache 208 reads the requested data from system memory 212 (for example, this might happen if different allocate commands for the same memory address are requesting less than a full cache-line of data). If the contents of a cache line are no longer valid or no longer in use (e.g., valid indicator 510 is 0 or reference count 506 is 0), then the corresponding cache line is available for overwriting by a new allocate request.

Described embodiments of L1 pipeline caches 208 support allocate operations with readthrough and writeback options. When an allocate with readthrough is received by L1 pipeline cache 208, L1 pipeline cache 208 reads the allocated data from system memory 212 even if the data associated with the request is already in the L1 pipeline cache line entry associated with that allocation request. When the data is read from system memory 212, L1 pipeline cache 208 merges the data read from system memory 212 with locally modified ("dirty") data in the L1 pipeline cache line entry such that any "dirty" data that was modified by processing module 300 but was not written back to system memory 212 is not updated with the data read from system memory 212. Any cache line locations that were not locally updated by processing module 300 are updated with the data read from system memory 212.

Figure 7:
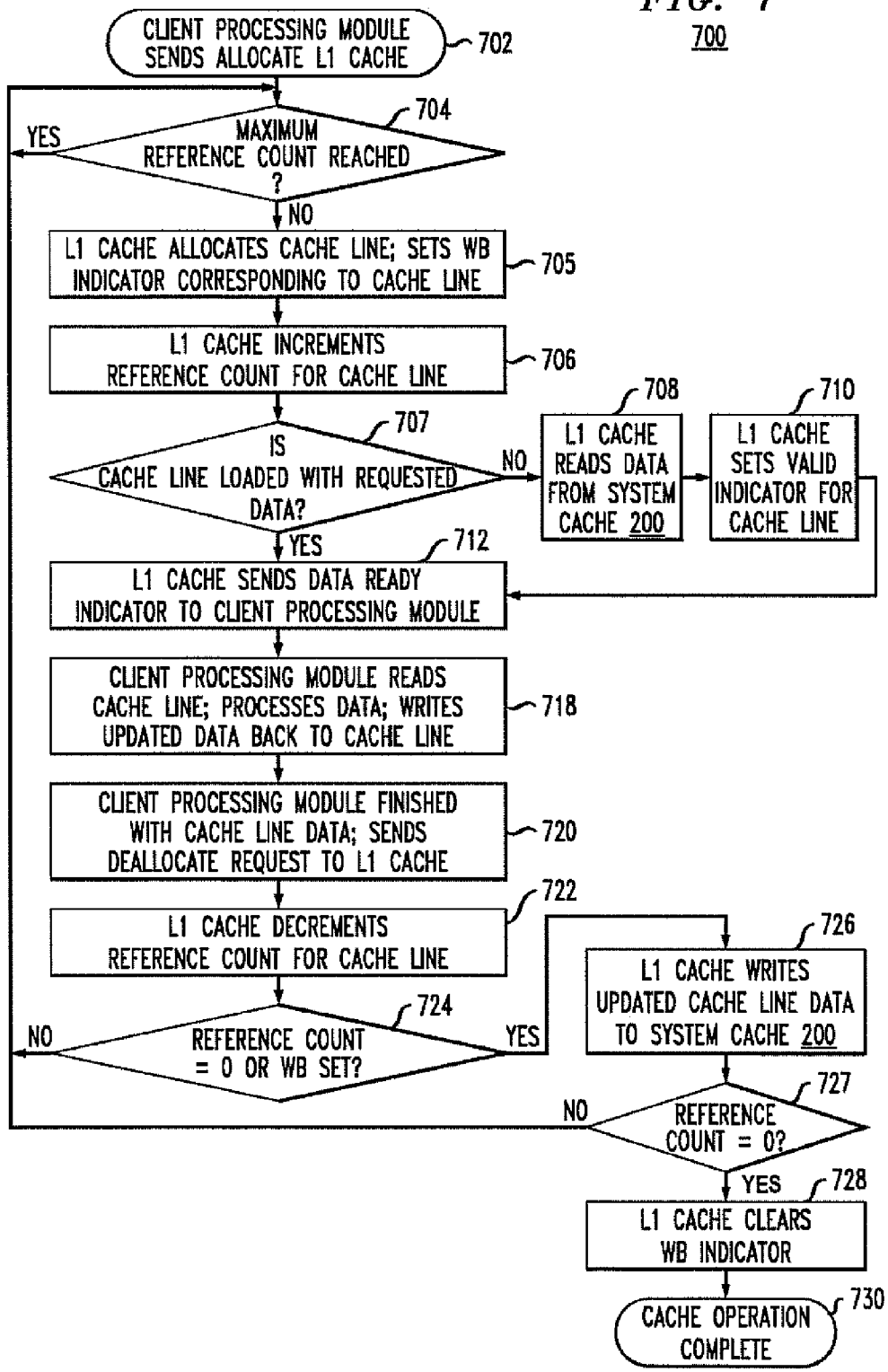
FIG. 7 shows an exemplary flow diagram of an allocate with writeback operation of the network processor of FIG. 1.

FIG. 7 shows allocate operation 700. As shown in FIG. 7, at step 702 processing module 300 sends an allocate operation to L1 pipeline cache 208. As described herein, the reference count of a given cache line is incremented when the cache line is allocated. At step 704, if the reference count has reached a threshold, L1 pipeline cache 208 might not allow an additional access to the cache line until a previous access completes and the reference count is decremented, for example at step 722. If the reference count is below the threshold, processing continues to step 705. At step 705, L1 pipeline cache 208 sets writeback indicator 508 associated with the given one of cache line entries 502(1)-502(N) corresponding to the allocated cache line for the writeback operation request. When the corresponding cache line entry 502(1)-502(N) is deallocated, L1 pipeline cache 208 writes back any modified ("dirty") data to system cache 200, for example at step 726.

Writeback indicator 508 is cleared when reference count 506 for the corresponding cache line entry 502(1)-502(N) is cleared, for example at step 728, meaning that the cache line entry is no longer in use by the client processing module. Writeback operations might typically be used to update data in system memory 212. At step 706, L1 pipeline cache 208 increments the reference count for the corresponding cache line.

Before processing module 300 is able to access a cache line entry, at step 707 processing module 300 checks whether the cache line entry is loaded with the requested data from system memory 212 using check ready interface 328. Thus, described embodiments avoid blocking or stalling cache read interface 324 and cache write interface 326 by attempting to access a cache line before the data is read from system memory 212. At step 712, L1 cache 206 sends a ready message to the client processing module on check ready interface 328 when the requested data is in the cache. Further, processing module 300 might optionally send L1 pipeline cache 208 a status request message on check ready interface 328 to check the status of a given cache line and offset, and L1 pipeline cache 208 might answer the check ready message when the requested data is ready. If, at step 707, the data is not yet stored in the cache line, at step 708 the data is read from system memory 212, and the valid indicator for the cache line is set at step 710.

As described, after processing module 300 requests a cache line allocation and L1 pipeline cache 208 responds that the cache line is allocated, client processing module checks whether the cache line entry is ready with the requested data from system memory 212 before accessing the cache line entry. Once L1 pipeline cache 208 responds that the requested data is ready at step 712, processing module 300 might begin accessing the entry at step 718. L1 pipeline cache 208 might be selectably set to either allow multiple concurrent active accesses to a given cache line, or to only allow a single active access at any one time.

At step 718, processing module 300 reads data from L1 pipeline cache 208 via read interface 324. Processing module 300 provides L1 pipeline cache 208 with the cache line number and the entry offset for the data to be read. L1 pipeline cache 208 provides the requested data to processing module 300. Similarly, processing module 300 writes data to L1 pipeline cache 208 via write interface 326. Processing module 300 provides L1 pipeline cache 208 with the data to be written, the cache line number and a write mask for the entry offset(s) within the cache line to be written. L1 pipeline cache 208 might typically perform read and write operations to the same cache line in order relative to when the read and write requests are received by L1 pipeline cache 208.

At step 720, when processing module 300 is finished with a given cache entry, processing module 300 sends L1 pipeline cache 208 a deallocate request, for example via allocate interface 322 or write interface 326. At step 722, when the deallocate request is received, L1 pipeline cache 208 decrements the reference count for the cache entry. If, at step 724, the reference count is decremented to zero or writeback indicator 508 is set, at step 726 L1 pipeline cache 208 writes dirty data from the cache entry to system memory 212. If, at step 724, the reference count is not decremented to zero and writeback indicator 508 is not set, processing returns to step 704. At step 727, if the reference count is decremented to zero, at step 728, writeback indicator 508 is cleared and, if the reference count is zero, the cache line is deallocated and available for reuse. At step 727, if the reference count is not decremented to zero, processing returns to step 704. At step 730, cache operation 700 is complete. L1 cache 206 might also configurably write cache line data to system memory 212 after every N deallocate requests, even if the reference count has not reached zero.

Embodiments of the present invention provide for updating control data structures and packet data structures coherently in memory when the structure is in active use by a memory client, such as in L1 pipeline cache 208. Described embodiments employ system cache 200 that interfaces to memory (e.g., external memory 116), and configuration interface 316 of the processing module. Described embodiments avoid the need for a tightly-coupled processor coherency bus.

Control data and packet data structures are used or operated on by the various μP cores 106 and hardware accelerators 108 of network processor 100. The control data and packet data structures might be accessed and updated by control software running on one of μP cores 106 as part of the operation of network processor 100. When a control data structure or packet data structure might need to be updated by software, a given one or ones of μP cores 106 might have a copy of the data structure in its local L1 cache 206(1)-206(N). The copy in the local L1 cache might be unchanged ("clean") or might have been modified by the μP core 106 ("dirty"). Described embodiments provide coherent updates of memory among multiple client processing modules that do not share a coherency bus, while still supporting dynamic updates of data structures by control software.

As shown in FIG. 3, network processor 100 might include network processor CPU adapter (NCA) 302. As shown, NCA 302 is in communication with one or more of the ring communication buses of network processor 100 to communicate with the various hardware accelerators 108. NCA 302 is also in communication with switch 110. As described herein, the various μP cores 106 might typically communicate between each other using a coherent communications bus, such as Processor Local Bus (PLB), which is a microprocessor bus architecture introduced by IBM, or Advanced eXtensible Interface (AXI), which is a higher frequency implementation of the Advanced Microcontroller Bus Architecture (AMBA) introduced by ARM Ltd.

NCA 302 might be employed to provide task data to one or more of accelerators 108 such that the task data in L1 pipeline caches 208 is coherent with data in the local CPU caches 206 and system cache 200. For example, the local caches of the various μP cores 106 might be coherent with each other by using a coherent communication bus architecture, such as PLB, to perform memory operations to request data for their corresponding L1 caches. NCA 302 might copy task data from system memory 112 through switch 110 to copy task data from system memory 112 to the CPU cache via the PLB bus. To copy data from system memory 112 to a CPU cache over the PLB bus, NCA 302 might include one or more communications bus bridges to communicate between two or more bus architectures, for example, as described in related U.S. patent application Ser. Nos. 12/979,551, 12/979,665 and 12/979,800 all filed Dec. 28, 2010, incorporated by reference herein.

As described herein, by employing a coherent communications bus, such as PLB, data coherency between the local caches of the various μP cores 106 is maintained. NCA 302 might also provide for communications between the various hardware accelerators 108 and the various μP cores 106. NCA 302 might further allow for communications buses internal to network processor 100 to be in communication with a processor external to network processor 100 via, for example, a PCI-E or SRIO communication bus architecture. Thus, NCA 302 might allow a processor external to network processor 100 to access data stored in system memory 112, which is internal to network processor 100, and also access data in external memory 116 without the external processor being directly connected to external memory 116.

In accordance with described embodiments, the various hardware accelerators 108 or other processing modules of network processor 100 might not typically employ a complex coherent communications bus architecture. To provide data coherency between the L1 pipeline caches 208 and system cache 200, NCA 302 might provide for atomic update operations between system cache 200 and L1 pipeline caches 208. For example, an atomic write operation might update data in system cache 200 with changed data in one of the L1 pipeline caches 208. An atomic read operation might update data in one of L1 pipeline caches 208 with data from system cache 200. An atomic update is an update that prevents any client processing module from overwriting updated data in a cache line being written by the atomic update.

Typically, atomic operations might occur a) when control software running on one of μP cores 106 requires current data from one of L1 pipeline caches 208 (an atomic write operation to system cache 200) or b) when control software running on one of μP cores 106 updates control data in system cache 200 and wants to ensure that the updated control data is also updated in L1 pipeline caches 208 (an atomic read operation from system cache 200). From a high-level view, an atomic operation might be divided into four steps: (1) control software updates data stored in system cache 200, some of which might be currently operated on in one of L1 pipeline caches 208; (2) NCA 302 performs an atomic write operation to system cache 200, tracking which bytes of the cache line are changed; (3) NCA 302 sends a configuration message to the corresponding one of L1 pipeline caches 208; and (4) NCA 302 performs an atomic read operation from system cache 200.

For example, to perform an atomic read operation, NCA 302 might issue a write to system cache 200 with updated data to one of L1 pipeline caches 208. System cache 200 writes the updated data, and for the atomic operation, also tracks which bytes of data in a given cache line were written by NCA 302. Each system cache 202(1)-202(N) might include address register 318 and byte count register 320. Address register 318 stores the tag and index address of cache lines corresponding to atomic access requests. Byte count register 320 stores the starting and ending bytes within a cache line corresponding to an atomic access. Thus, registers 318 and 320 indicate a contiguous area of a cache line corresponding to an atomic write operation, and prevent the area from being overwritten by non-atomic write operations before the atomic operation is complete. For example, if system cache 200 receives a non-atomic write operation, system cache 200 might process the non-atomic write operation as a read-modify-write (RMW) operation for a given cache line, without changing the bytes of the cache line that were written by the atomic write operation (e.g., the bytes indicated in byte count register 320 for the cache line indicated in address register 318). In embodiments of the present invention, each system cache 200 might support one active atomic write operation to each system cache 202(1)-202(N).

After the atomic write to system cache 200 is complete, NCA 302 sends a signal to the corresponding accelerator 108 indicating that the atomic write operation is complete and that processing on the data by the accelerator can begin. In embodiments of the present invention, NCA 302 transmits the atomic write complete signal via a configuration ring bus between the accelerators 108 (e.g., configuration interface 316). As described in related U.S. patent application Ser. No. 12/782,379, a ring bus of network processor 100 might be a unidirectional bus that passes signals from a source processing module, to a next processing module on the ring bus, with the signals passed module-to-module until a corresponding destination processing module receives the signal. As described herein, a configuration ring bus of network processor 100 might be employed to pass small configuration messages between NCA 302 and accelerators 108.

Upon receiving the atomic write complete signal, the corresponding accelerator 108 will either: (1) if its L1 pipeline cache 208 has dirty data, processing module 300 of accelerator 108 invalidates the cache line in L1 208 and writes the dirty data to system cache 200 via NCA 302, or (2) if L1 pipeline cache 208 has clean data, accelerator 108 invalidates the cache line in L1 pipeline cache 208 without writing any data. When the writes and/or invalidate operations are complete, processing module 300 sends an acknowledge signal to NCA 302. When NCA 302 receives the acknowledge signal, NCA 302 issues an atomic read request to system memory 212. When system memory 212 receives the atomic read request, system memory 212 clears the atomic write state data from registers 318 and 320. Once the atomic write state data is cleared from registers 318 and 320, any subsequently received non-atomic write operations are processed by system memory 212 as normal write operations rather than RMW operations. Any subsequently received atomic write operations are processed as described above.

Figure 6:
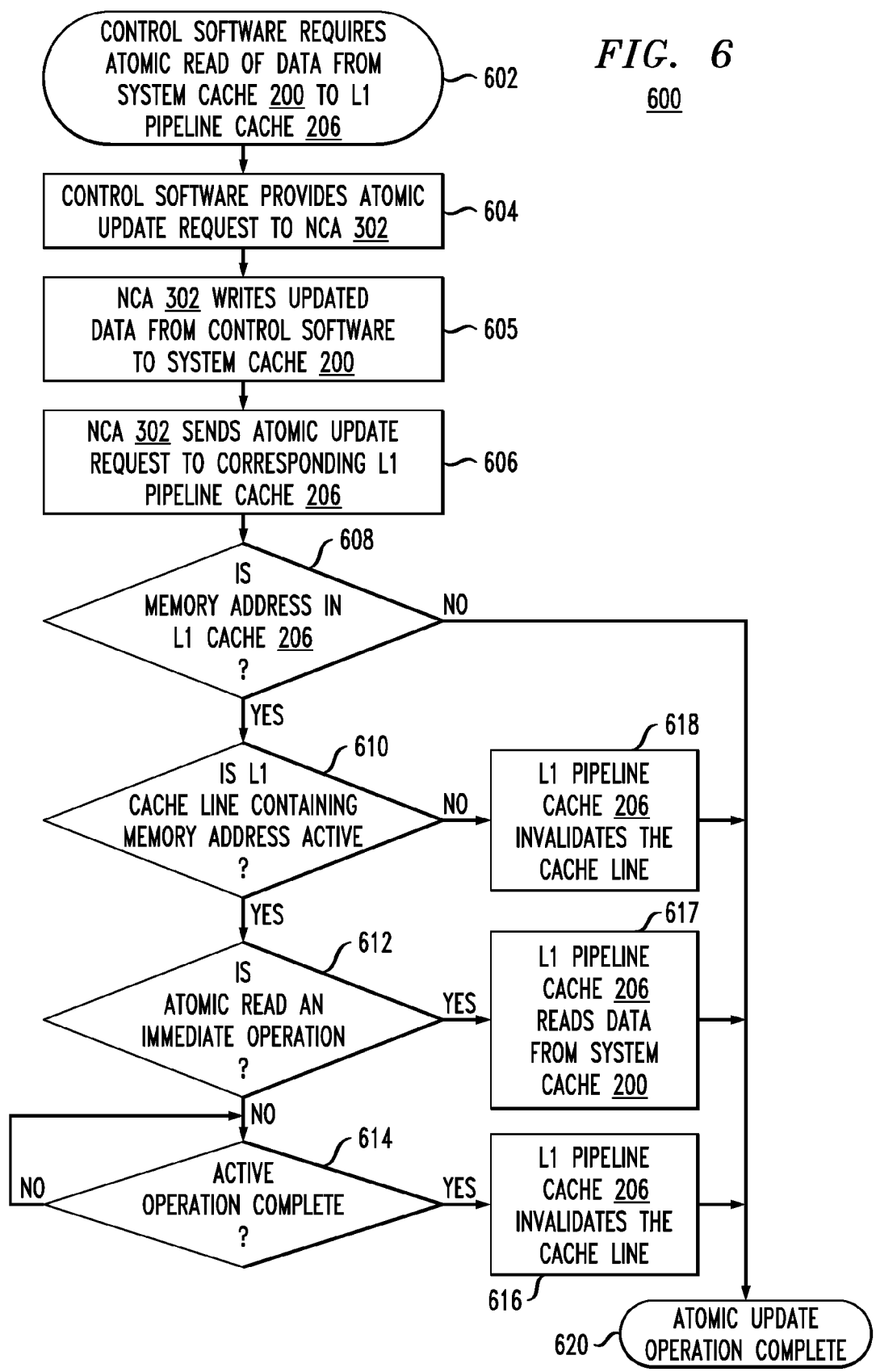
FIG. 6 shows an exemplary flow diagram of an atomic read operation of the network processor of FIG. 1.

FIG. 6 shows an exemplary flow diagram of atomic update operation 600. As shown in FIG. 6, at step 602, control software of network processor 100 generally requires an update to data stored in system cache 200. At step 604, the control software issues an atomic update request for system cache 200 to NCA 302. At step 605, NCA 302 writes data provided by the control software corresponding to the atomic update to system cache 200. At step 606, NCA 302 sends the atomic update request to at least one client processing module, such as accelerators 108. Although shown in FIG. 6 as only for one accelerator 108 and L1 pipeline cache 208, NCA 302 might broadcast an atomic update operation from the control software to multiple accelerators 108 having a corresponding L1 pipeline cache 208, for example via a configuration ring of network processor 100. Alternatively, a given accelerator 108 might have multiple L1 pipeline caches 208. When a corresponding one of L1 pipeline cache 208 receives an atomic update request, L1 pipeline cache 208 performs an atomic read operation corresponding to the memory address from the atomic update request at step 608. This operation checks whether data stored at the memory address corresponding to the atomic update from control software is stored in L1 pipeline cache 208. If the memory address is not included in L1 pipeline cache 208, the atomic read operation is cancelled at step 620.

At step 610, if the memory address is included in L1 pipeline cache 208, but the cache line reference count is equal to zero, meaning that the cache line is not actively in use, at step 618 L1 pipeline cache 208 invalidates the cache line such that any subsequent allocate operations for the address must be read from system memory 212 to include up-to-date data due to the atomic update request. At step 610, if the memory address is in L1 pipeline cache 208 and the reference count is not zero, then at step 612 L1 pipeline cache 208 checks whether the atomic read operation includes an option to perform the atomic read operation immediately.

If, at step 612, the atomic read operation is an immediate operation, then at step 617, the atomic read operation is performed by retrieving the data from system cache 200 corresponding to the atomic update request and storing the updated portions of the data to the corresponding cache line in L1 pipeline cache 208. If, at step 612, the atomic read operation is not an immediate operation, then at step 614 the atomic read request is not processed until one or more active operations on the cache line are complete. Once the write operation is complete, at step 616 L1 pipeline cache 208 invalidates the cache line such that any subsequent allocate operations for the address must be read from system memory 212 to include up-to-date data due to the atomic update request. When the subsequent allocate operation occurs, L1 pipeline cache 208 retrieves the data from system cache 200 corresponding to the atomic update request and stores the updated portions of the data to the corresponding cache line in L1 pipeline cache 208. After the subsequent allocate operation occurs, L1 pipeline cache 208 includes the current data from system cache 200 while preserving locally modified data in the L1 that was not part of the atomic update request. The atomic update operation is complete at step 620.

FIG. 8 shows a flow diagram of atomic write operation 800 to system cache 200. At step 802, control software operating on one of μP cores 106 requires an atomic write of data to system cache 200, for example to update control data without one of accelerators 108 overwriting the new control data. At step 804, if L1 pipeline cache 206 contains updated data, at step 806 the updated data is written to system cache 200 without overwriting data changed by μP core 106. If L1 pipeline cache 206 does not contain updated data, at step 808 the atomic write operation is complete.

Thus, as described herein, embodiments of the present invention provide for storing data in a local cache of one of a plurality of processing modules of a network processor. A control processing module determines presence of data stored in its local cache while concurrently sending a request to read the data from a shared memory and from one or more local caches corresponding to other of the plurality of processing modules. Each of the plurality of processing modules responds whether the data is located in one or more corresponding local caches. The control processing module determines, based on the responses, presence of the data in the local caches corresponding to the other processing modules. If the data is present in one of the local caches corresponding to one of the other processing modules, the control processing module reads the data from the local cache containing the data and cancels the read request to the shared memory.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of storing data in a local cache of a control processing module of a network processor having a plurality of processing modules and at least one shared memory, the method comprising:

determining, by the control processing module, presence of data stored in a local cache of the control processing module, the data for an operation of the control processing module, while concurrently sending (i) a speculative read request to the at least one shared memory to read the data from the at least one shared memory, and (ii) a second read request to one or more of the plurality of processing modules of the network processor;

determining, by a memory controller of the at least one shared memory, a physical address of the data in the at least one shared memory in response to the speculative read request;

responding to the second read request, by each of the one of more of the plurality of processing modules, whether the data is located in one or more local caches of the one or more of the plurality of processing modules;

determining, by the control processing module based on the responses of the one or more of the plurality of processing modules, presence of the data in one or more local caches of the one or more of the plurality of processing modules; and if the control processing module determines that the data is not present in the local cache processing module, but that the data is present in one of the local caches of the one or more of the plurality of processing modules:

reading, by the control processing module, the data from one of the local caches of the one or more of the plurality of processing modules containing the data; and canceling, by the control processing module, the speculative read request to the at least one shared memory;

wherein if the control processing module determines the data is not present in one of the local caches of the other control processing modules:

sending a control signal to the at least one shared memory to indicate to proceed with the speculative read request; and reading the data from the at least one shared memory;

wherein the speculative read request is sent to the at least one shared memory of the network processor over a read interface of the network processor, the speculative read request comprising a read request that includes a speculative read indicator which indicates that the read request is a speculative read request;

wherein the speculative read request is canceled by the control processing module sending a control signal over a dedicated speculative read interface of the network processor, which is separate from the read interface of the network processor.

2. The method of claim 1, wherein the step of determining a physical address of the data in the at least one shared memory further comprises:

storing, by the memory controller, the physical address of the data corresponding to the speculative read request in a queue of the memory controller.

3. The method of claim 1, further comprising:

if the control processing module determines that the data is not present in one of the local caches of the one or more of the plurality of processing modules:

sending, by the control processing module, a control signal to the at least one shared memory over the speculative read interface of the network processor, which control signal comprises an indicator to proceed with the read request to the memory controller; and reading the data from the at least one shared memory.

4. The method of claim 1, wherein, for the method, the at least one shared memory comprises at least one of an embedded RAM and a double data rate (DDR) DRAM coupled to the network processor.

5. The method of claim 1, wherein the control processing module comprises a Reduced Instruction Set Computing (RISC) central processing unit (CPU).

6. The method of claim 1, wherein the at least one shared memory comprises one or more system caches.

7. The method of claim 1, wherein the second dread request is sent over an inter-processor communications bus of the network processor.

8. The method of claim 1, wherein the speculative read interface comprises a two-bit sideband bus, with a first bit indicating whether or not a corresponding speculative read request should proceed, and a second bit indicating whether the corresponding speculative read request is valid.

9. The method of claim 1, wherein the at least one shared memory comprises one or more queues for storing received read requests.

10. A non-transitory machine-readable medium, having encoded thereon program code, wherein, when the program code is executed by a machine, the machine implements a method of storing data in a local cache of a control processing module of a network processor having a plurality of processing modules and at least one shared memory, the method comprising:

determining, by the control processing module, presence of data stored in a local cache of the control processing module, the data for an operation of the control processing module, while concurrently sending (i) a speculative read request to the at least one shared memory to read the data from the at least one shared memory, and (ii) a read request to one or more of the plurality of processing modules of the network processor;

determining, by a memory controller of the at least one shared memory, a physical address of the data in the at least one shared memory in response to the speculative read request;

responding to the second read request, by each of the one or more of the plurality of processing modules, whether the data is located in one or more local caches of the one or more of the plurality of processing modules;

determining, by the control processing module based on the responses of the one or more of the plurality of processing modules, presence of the data in one or more local caches of the one or more of the plurality of processing modules;

determining, by the control processing module based on the responses of the one or more of the plurality of processing modules, presence of the data in one or more local caches of the one or more of the plurality of processing modules; and if the control processing module determines that the data is not present in the local cache of the control processing module, but that the data is present in one of the local caches of the one or more of the plurality of processing modules:

reading, by the control processing module, the data from one of the local caches of the one or more of the plurality of processing modules containing the data; and canceling, by the control processing module, the speculative read request to the at least one shared memory;

wherein if the control processing module determines the data is not present in one of the local caches of the other control processing modules:

sending a control signal to the at least one shared memory to indicate to proceed with the speculative read request; and reading the data from the at least one shared memory;

wherein the speculative read request is sent to the at least one shared memory of the network processor over a read interface of the network processor, the speculative read request comprising a read request that includes a speculative read indicator which indicates that the read request is a speculative read request;

wherein the speculative read request is canceled by the control processing module sending a control signal over a dedicated speculative read interface of the network processor, which is separate from the read interface of the network processor.

11. The non-transitory machine-readable medium of claim 10, wherein the step of determining a physical address of the data in the at least one shared memory further comprises:

storing, by the memory controller, the physical address of the data with the corresponding to the speculative read request in a queue of the memory controller.

12. The non-transitory machine-readable medium of claim 10, further comprising:

if the control processing module determines that the data is not present in one of the local caches of the one or more of the plurality of processing modules:

sending, by the control processing module, a control signal to the at least one shared memory over the speculative read interface of the network processor, which control signal comprises an indicator to proceed with the read request to the memory controller; and reading the data from the at least one shared memory.

13. The non-transitory machine-readable medium of claim 10, wherein, for the method, the at least one shared memory comprises at least one of an embedded RAM and a double data rate (DDR) DRAM coupled to the network processor.

14. The non-transitory machine-readable medium of claim 10, wherein the control processing module comprises a Reduced Instruction Set Computing (RISC) central processing unit (CPU).

15. The method of claim 10, wherein the second read request is sent over an inter-processor communications bus of the network processor.

16. The method of claim 10, wherein the speculative read interface comprises a two-bit sideband bus, with a first bit indicating whether or not a corresponding speculative read request should proceed, and a second bit indicating whether the corresponding speculative read request is valid.

17. A network processor comprising:
at least one shared memory;
one or more control processing modules each having at least one local cache, wherein the one or more control processing modules communicate via an inter-processor communications bus;
when a first control processing module requires data to perform an operation, the first control processing module is configured to concurrently (i) determine presence of data stored in one or more local caches of the first control processing module, (ii) send a speculative read request to read to the at least one shared memory to read the data from the at least one shared memory, and (iii) send a second read request to other control processing modules of the network processor via the inter-processor communications bus to determine presence of the data in one or more local caches of the other control processing modules; and
a memory controller of the at least one shared memory configured to determine a physical address of the data in the at least one shared memory in response to the speculative read request;
wherein the speculative read request is sent to the at least one shared memory over a read interface of the network processor, the speculative read request comprising a read request that includes a speculative read indicator which indicates that the read request is a speculative read request;
wherein if the data is not present in the one or more local caches of the first control processing module, the first control processing module is further configured to:
determine, based on responses from the other control processing modules, presence of the data in one or more local caches of the other control processing modules;
wherein if the data is present in one of the local caches of the other control processing modules, the first control processing module is further configured to:
read the data from one of the local caches of the other control processing modules containing the data; and
send a control signal to the shared memory to cancel the speculative read request;
wherein if the data is not present in one of the local caches of the other control processing modules, the first control processing module is further configure to:
send a control signal to the shared memory to indicate to proceed with the speculative read request; and
read the data from the at least one shared memory,
wherein the control signal to cancel or proceed with the speculative read request is sent over a dedicated speculative read interface of the network processor, which is separate from the read interface of the network processor.

18. The network processor of claim 17, wherein the at least one shared memory comprises at least one of an embedded RAM and a double data rate (DDR) DRAM coupled to the network processor and wherein the client processing module comprises a Reduced Instruction Set Computing (RISC) central processing unit (CPU).

19. The network processor of claim 17, wherein the network processor is implemented as an integrated circuit chip.

20. The method of claim 1, further comprising:
storing, by the control processing module, dynamic state data and configuration state data in a same cache line entry of the local cache of the control processing module; and
performing, by the control processing module, a dynamic byte write operation to writeback updated state data to the cache line entry without overwriting updated configuration state data that is generated when a configuration update occurs while the state data in said cache line entry is being operated on.

* * * * *